No. 874,886. PATENTED DEC. 24, 1907.
F. L. EBERHARDT.
GEAR CUTTER.
APPLICATION FILED MAY 25, 1907.

WITNESSES:
Wm. J. Zimmermann
Edwin C. Thurston

INVENTOR
Frederick L. Eberhardt

UNITED STATES PATENT OFFICE.

FREDERICK L. EBERHARDT, OF NEWARK, NEW JERSEY.

GEAR-CUTTER.

No. 874,886.   Specification of Letters Patent.   Patented Dec. 24, 1907.

Application filed May 25, 1907. Serial No. 375,713.

To all whom it may concern:

Be it known that I, FREDERICK L. EBERHARDT, of the city of Newark and the county of Essex, in the State of New Jersey, have invented certain new and useful Improvements in Gear-Cutters, of which the following is a specification.

This invention relates primarily to circular disk cutters and is especially adapted to formed cutters, used in the cutting of gear wheels.

It has been found in cutting the spaces of gear wheels with circular disk cutters, that when the cutting faces on the periphery of the cutter were reduced, an increased cutter feed could be maintained over that of an ordinary constructed cutter. In any cutter wherein the continuity of the cutting surfaces are broken, an easier working cutter is obtained which can be explained in the fact of it giving the chip a vent, or in other words preventing their clogging, by breaking the chips; furthermore it reduces the continuous frictional surface brought to bear upon the material to be removed by the said cutter.

The reduced peripheral cutting face has already been accomplished in the following way: by beveling off alternate teeth on both sides, or the beveling was done on alternate sides of consecutive teeth, the latter method, however, has this disadvantage, in that it produces an oscillating motion of the wheel blank being cut, in a direction tangential to its circumference, thus impairing the accuracy of the slot as to its form, also the accurate spacing. The former method is not applicable to a formed cutter, inasmuch as it leaves an extra ridge or depression in the center of the space. Still another method was to have a series of spiral grooves in the peripheral cutting surface, these grooves, however, tend to shift the blank in the direction of the helical path of the said grooves.

The novelty in the present invention consists in that it embodies the advantage of the reduced peripheral cutting faces, eliminating the disadvantages cited above, existing in the methods heretofore employed to accomplish the same result.

The invention comprises a circular disk cutter having radially projecting teeth with less than one-half the peripheral cutting face cut away on alternate sides of consecutive teeth.

Figure 1:
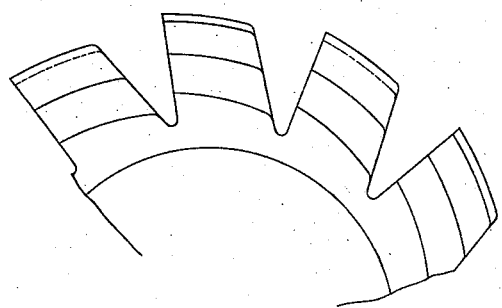
Figure 2:
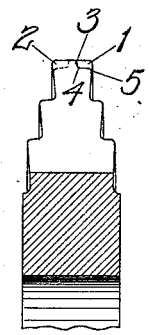
Figure 3:
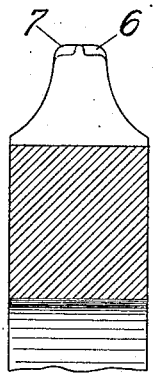
Figure 4:
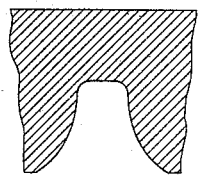

In the accompanying drawings Figure 1 represents a front elevation of a stepped blocking or stocking out cutter. Fig. 2 is a sectional end elevation of the same, and Fig. 3 is an end elevation of a formed finishing gear cutter embodying the present invention. Fig. 4 is a space cut with cutter as shown in Fig. 3.

Referring to Fig. 2: 1 and 2 represent rectangular depressions in alternate sides of consecutive teeth; in Fig. 3 they are represented at 6 and 7. The distance from 4 to 5 is slightly less than one-half of the total cutting face on the periphery, thus eliminating any possibility of leaving a thin film of metal in the center of the space cut. It will be further noticed that the distance from 3 to 4 is slight compared with the entire depth to be cut, it being just sufficient to break the continuity of the peripherial cutting face. A cutter so constructed as described, has been found to produce an easier working cutter, enabling a heavier feed to be maintained without seriously impairing the machine in which the said cutter may be used; further it eliminates to a considerable extent the chatter caused by the cutters as heretofore constructed by reducing the frictional cutting resistance, thus increasing the accuracy of the space as to the form, also producing more accurate spacing. Neither does it produce the oscillating motion in the wheel blank being cut, as is the case of a beveled cutter nor the shifting of the blank as in a cutter having spiral grooves in the periphery.

When using lubricant, the broken cutting surfaces on alternate sides of consecutive teeth allow the forcing of the lubricant to the cutting face of each tooth, thus insuring a more thorough lubrication than can be obtained in cutters as heretofore constructed.

Having described my invention and its method of application, I claim as new and wish to secure by Letters Patent.

1. As a new article of manufacture, a circular metal cutter, with radially projecting teeth, having peripheral and lateral cutting edges the continuity of said peripheral cutting faces slightly reduced in the direction of their radii on alternate sides of consecutive teeth, said reduction constituting slightly less than one half the total width of said peripheral cutting faces.

2. As a new article of manufacture, a circular metal cutter, with radially projecting teeth, having peripheral and lateral cutting edges the continuity of said peripheral cutting faces slightly reduced in the direction of their radii on alternate sides of consecutive teeth, said reduction constituting rectangular portions slightly less than one half of the total width of said peripheral cutting faces.

FREDERICK L. EBERHARDT.

Witnesses:
JOSEPH B. PIERSON,
C. E. HOLGATE.